Sept. 1, 1959  R. M. WHEELER  2,902,683
SIGNAL SYSTEMS WITH WARNING DEVICES
Filed Feb. 19, 1958
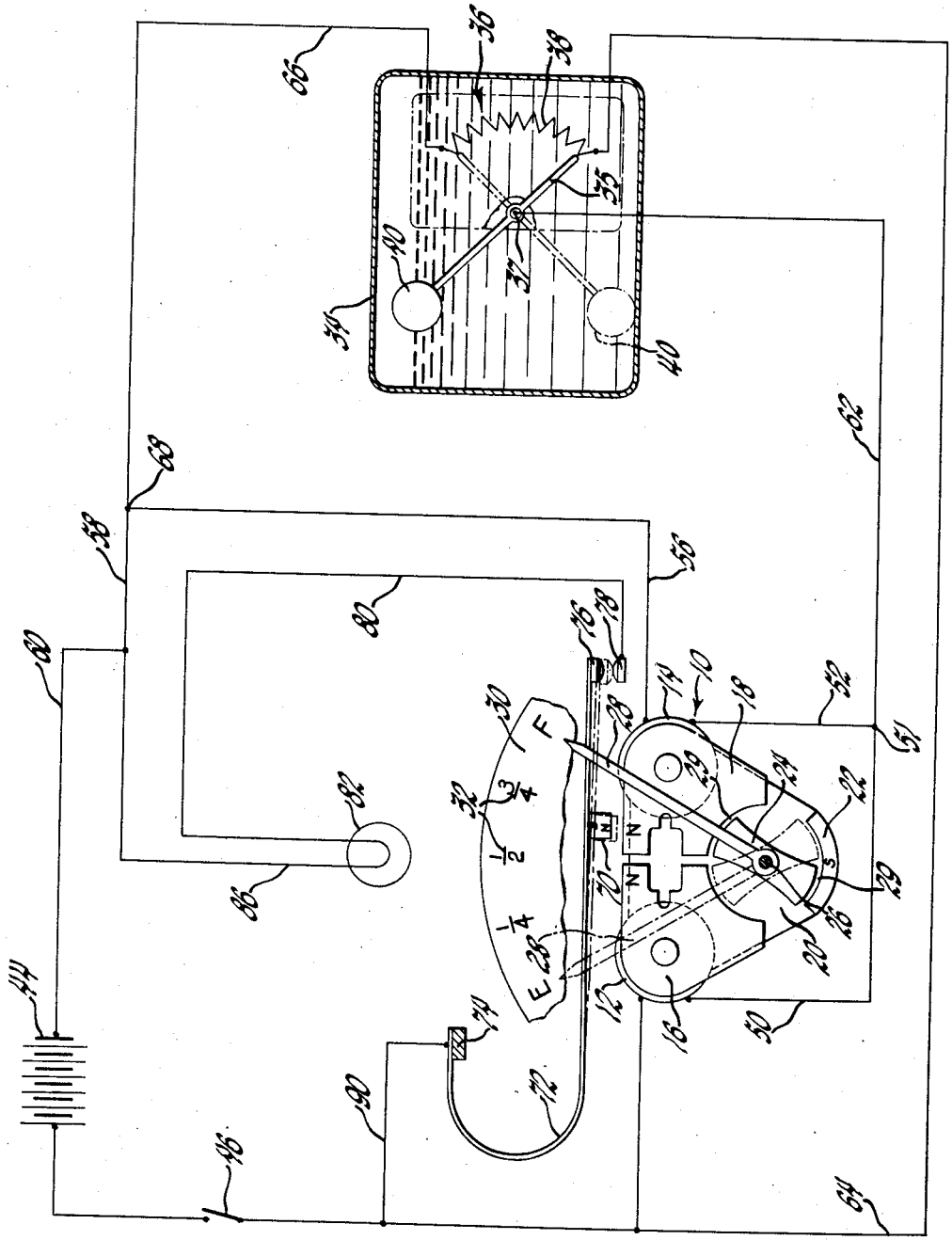
INVENTOR.
Roscoe M. Wheeler
BY
J. W. Lovett
ATTORNEY

United States Patent Office 2,902,683
Patented Sept. 1, 1959

2,902,683

SIGNAL SYSTEMS WITH WARNING DEVICES

Roscoe M. Wheeler, Flint, Mich., assignor to General Motors Corporation, Detroit, Mich., a corporation of Delaware Application February 19, 1958, Serial No. 716,096

6 Claims. (Cl. 340—244)

This invention relates to signal systems and more particularly to such systems as are electrically operated and associated with warning devices for indicating the attainment of predetermined conditions.

Gauges are commonly employed in automotive vehicles for advising operators of conditions obtaining in locations remote from the gauges such as liquid level in a fuel tank or pressure in a lubricating system or temperature in a cooling system. Whatever the remote condition to be indicated, such gauges are often electrically actuated and one form of such a gauge employs two coils and an armature for rotating an indicating pointer. An example of such a gauge is disclosed in the United States patent application Serial No. 679,019, filed August 19, 1957, in the names of Harold H. Greenley and Lucian B. Smith and entitled "Electromagnetic Indicators."

Although such gauges effectively perform their function which is to indicate a variable condition, such as the existent liquid level in a fuel tank, it would be advantageous compactly to combine a warning device in the indicator system that would impress upon the operator that a condition other than normal has been attained which condition needs his prompt attention—such as low fuel supply.

To these ends, an object of the present invention is to provide a signal system involving a gauge for indicating a variable condition, the gauge being associated with a warning device or signal circuit for indicating an abnormal condition, the entire system being simple in structure and capable of rendering reliable service under adverse conditions.

A feature of the invention is a system using a gauge having multiple coils with one pole piece associated with one of the coils being arranged to control a signal circuit in accordance with conditions as indicated by a potentiometer remote from the gauge.

These and other important features of the invention will now be described in detail in the specification and then set forth more particularly in the appended claims.

In the drawing, which is schematic in form, a gauge is generally indicated at 10. This gauge is provided with two coils 12 and 14. A pole piece 16 is arranged at the end of the coil 12 and a pole piece 18 is placed at the end of the coil 14. These pole pieces are of ferrous material; i.e., of high permeability to become magnetized by induction when current is passed through the coils. A frame 20 of the gauge 10 is also of ferrous material and it has an arcuate portion 22. The latter, together with the pole pieces 16 and 18, presents surfaces which describe arcs around an elongated armature 24. The latter is joined midway its length to a shaft 26, and a pointer 28 is mounted for rotation together with the shaft and armature and with respect to the frame 20. As seen in the drawing, the armature 24 is so shaped and of such size that a slight air gap 29 is presented between each end of the armature and the pole pieces or portion 22. A dial 30 is conventionally mounted on the gauge 10 so that the pointer 28 may register a reading by virtue of the symbols 32 on the dial.

A gasoline tank is indicated at 34 and enclosed within the tank is a potentiometer generally indicated at 36. This potentiometer includes an arcuate resistance element 38 and a swinging arm 35 mounted on a shaft 37. One end of the arm 35 presents a sliding contact on the arcuate resistance element 38 and the other end of the arm 35 carries a float 40.

A source of power, such as a battery 44, is connected through a switch 46 to one end of a coil 12. The other end of the latter is connected by a line 50 at a junction 51 with a line 52 leading to one end of the coil 14. The other end of the latter is connected by a line 56 to a line 58 which in turn is connected by a return line 60 leading to the battery. The coil 12 and the line 52 are connected by means of a line 62 to the shaft 37 of the potentiometer. The switch 46 is also connected by a line 64 to one end of the resistance element 38. The other end of the latter is connected by a line 66 to the lines 58 and 56 at their junction 68.

Adjacent to and in the same plane as the pole piece 18 is located a permanent magnet 70. Its polarity is such that it is repelled by the pole piece 18 when the coil 14 is energized. The magnet 70 is mounted on a curved leaf spring 72 which in turn is fixed at one end to a stationary support 74. The other end of the leaf spring 72 bears a contact 76 which is adapted to cooperate with a fixed contact 78. The latter is connected by a line 80 to a signal device 82 which may be a lamp or bell or some other electrically operated device capable of giving a warning. A line 86 serves to connect or ground the signal device 82. A line 90 connects the switch 46 with the leaf spring 72 and, of course, the latter is suitably insulated from ground.

In the operation of the gauge 10 and assuming that the tank 34 is full of fuel, the float 40 will be as indicated in full lines in the drawing. As a result and assuming that the switch 46 is closed, current will flow through the coil 12 but a stronger current will flow by way of the line 64, arm 35 and lines 62 and 52 to the coil 14. As a result, the pole piece 18 will be strongly magnetized and will strongly repel the magnet 70 and hold the contact 76 in its open position with respect to the contact 78. The signal device 82 will, therefore, not be in operation when the tank 34 is full and the pointer 28 is positioned as shown in full lines.

Assuming, however, that the float 40 is in its low position as shown in dot-and-dash lines indicating that the tank 34 is substantially empty, current will flow strongly through the coil 12, arm 35 and line 66 and the coil 14 will be shunted out. A minimum of current then passing through the coil 14 will weaken the pole piece 18 in its ability to repel the magnet 70 and, as a result, the contacts 76 and 78 will close by action of the spring 72 and the signal 82 will be brought into operation to warn the operator that the fuel level is low as the pointer 28 assumes its position at E as shown in dot-and dash lines.

I claim:

1. A signal system including a power source, an electrically operated gauge, a potentiometer having a movable contact arranged to be relatively displaced depending upon a condition to be indicated by the gauge, said gauge having a rotatable armature, an indicator such as a pointer connected to said armature to rotate therewith, a pair of magnetic pole pieces arranged in proximity to said armature, two coils connected in series with said power source, each of said coils being adapted to magnetize one of said pole pieces when energized, said potentiometer being connected in parallel with said coils and having said movable contact connected to the junction of said coils, a switch adapted to be operated by the magnetic field of one of said pole pieces, and a signal circuit controlled by said switch.

2. A signal system including a power source, a potentiometer having a contact arranged to be relatively displaced in accordance with a variable condition to be indicated, a gauge having an armature movable depending upon said condition, magnetic pole pieces arranged in proximity to said armature, coils connected in series with said power source, each of said coils being adapted to magnetize one of said pole pieces when energized, said potentiometer being connected in parallel with said coils with said contact being connected to the junction of said coils, a switch adapted to be operated by the magnetic field of one of said pole pieces, and a signal circuit controlled by said switch.

3. A signal system including a power source, a gauge, a potentiometer remote from said gauge and having a contact movable in accordance with a condition to be indicated by the said gauge, the latter having two coils connected in series with said power source, a magnetic pole piece associated with each of said coils to be magnetized thereby, said coils being connected in parallel with said potentiometer, said contact being connected to the junction of said coils, and a signal circuit controlled by the magnetic field of one of said pole pieces.

4. A signal system including a power source, a gauge, a potentiometer remote from said gauge and having a contact movable in accordance with a condition to be indicated by the said gauge, the latter having coils connected in series with said power source, a magnetic pole piece associated wtih each of said coils to be magnetized thereby, said coils being connected in parallel with said potentiometer, said contact being connected to a junction of said coils, a signal circuit including a fixed contact and a resiliently mounted contact, and the latter contact being arranged to be controlled by the magnetic field induced in one of said pole pieces.

5. A signal system including a power source, a potentiometer having a movable contact, a gauge with a first coil and a second coil each having a first and a second terminal, said first and second coils being connected in series with said power source and in parallel with said potentiometer, the first terminal of the first coil being connected to one side of said power source and the second terminal of the second coil being connected to the other side of said power source, said movable contact being connected to said second terminal of said first coil and also connected to said first terminal of said second coil, a magnetic pole piece associated with one of said coils to be magnetized thereby, and a signal circuit controlled by the magnetic field of said pole piece.

6. A signal system such as set forth in claim 5, the signal circuit including a resiliently mounted contact adapted to be moved by the magnetic field set up by the pole piece.

References Cited in the file of this patent

UNITED STATES PATENTS

| | | |
|---|---|---|
| 1,171,405 | Ablon | Feb. 15, 1916 |
| 2,127,422 | Phaneuf | Aug. 16, 1938 |
| 2,339,021 | Lingel | Jan. 11, 1944 |
| 2,511,399 | De Giers | June 13, 1950 |